(12) United States Patent
Yoshikawa et al.

(10) Patent No.: US 11,940,120 B2
(45) Date of Patent: Mar. 26, 2024

(54) DESKTOP ILLUMINATION DEVICE

(71) Applicant: NITTO DENKO CORPORATION, Osaka (JP)

(72) Inventors: Takahiro Yoshikawa, Osaka (JP); Kozo Nakamura, Osaka (JP); Yufeng Weng, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 18/017,503

(22) PCT Filed: Jul. 19, 2021

(86) PCT No.: PCT/JP2021/026903
§ 371 (c)(1),
(2) Date: Jan. 23, 2023

(87) PCT Pub. No.: WO2022/024829
PCT Pub. Date: Feb. 3, 2022

(65) Prior Publication Data
US 2023/0280005 A1 Sep. 7, 2023

(30) Foreign Application Priority Data

Jul. 28, 2020 (JP) .................. 2020-127348

(51) Int. Cl.
F21S 6/00 (2006.01)
F21V 8/00 (2006.01)

(52) U.S. Cl.
CPC .............. F21S 6/003 (2013.01); G02B 6/005 (2013.01)

(58) Field of Classification Search
CPC .................. G02B 6/005; F21S 6/003
See application file for complete search history.

(56) References Cited

U.S. PATENT DOCUMENTS

2012/0268966 A1 10/2012 McCollum et al.
2017/0329064 A1 11/2017 Dor et al.
(Continued)

FOREIGN PATENT DOCUMENTS

CH 715534 A1 * 5/2020
JP 8-248421 9/1996
(Continued)

OTHER PUBLICATIONS

International Search Report issued in International Patent Application No. PCT/JP2021/026903, dated Aug. 31, 2021.
(Continued)

Primary Examiner — Gerald J Sufleta, II
(74) Attorney, Agent, or Firm — GREENBLUM & BERNSTEIN, P.L.C.

(57) ABSTRACT

A desktop illumination device includes a light source; and a light guide including a light guide plate. The light guide plate has a light incident surface and first and second main surfaces. An angle at which an intensity becomes maximum in a light distribution of light emitted from the first main surface is in a range of −90° or more to less than 0°, in a case where an axis passing through a center of the first main surface and perpendicular to an installation surface is defined as a vertical axis, and in a plane including the vertical axis and perpendicular to the installation surface, a direction parallel to the installation surface is defined as vertical 0°, an upward angle with respect to the vertical 0° is defined as a positive angle, and a downward angle with respect to the vertical 0° is defined as a negative angle.

17 Claims, 17 Drawing Sheets

(56) References Cited

U.S. PATENT DOCUMENTS

| | | | |
|---|---|---|---|
| 2020/0332973 A1* | 10/2020 | Wang | ............. F21S 6/002 |
| 2020/0348462 A1 | 11/2020 | Hattori et al. | |
| 2021/0011211 A1 | 1/2021 | Rinko | |
| 2021/0109274 A1 | 4/2021 | Rinko et al. | |

FOREIGN PATENT DOCUMENTS

| | | | |
|---|---|---|---|
| JP | 2003-202568 | 7/2003 | |
| JP | 2009-110783 | 5/2009 | |
| JP | 2011-28868 | 2/2011 | |
| JP | 2012-156082 | 8/2012 | |
| JP | 2013-200993 | 10/2013 | |
| JP | 2018-500719 | 1/2018 | |
| WO | 2011/124765 | 10/2011 | |
| WO | 2011/127187 | 10/2011 | |
| WO | 2019/087118 | 5/2019 | |
| WO | 2019/146628 | 8/2019 | |
| WO | 2019/182091 | 9/2019 | |
| WO | 2019/182098 | 9/2019 | |
| WO | WO-2019224705 A1 * | 11/2019 | ........... G02B 6/0036 |

OTHER PUBLICATIONS

Written Opinion issued in International Patent Application No. PCT/JP2021/026903, dated Aug. 31, 2021.

* cited by examiner

DESKTOP ILLUMINATION DEVICE

TECHNICAL FIELD

The present invention relates to a desktop illumination device.

BACKGROUND ART

Illumination devices using light emitting diodes (LEDs) are widely used. For LED illumination, the luminous flux from one LED is small, and thus, it is common to use a plurality of LEDs together. Such LED illumination produces a phenomenon called "multi-shadow" in which shadows are generated as many as the number of light sources, and as a result, flicker occurs.

A directional illumination device that changes light emission from LEDs, which are light sources, to directional planar or linear light emission has been proposed (see Patent Document 1, for example). In this illumination device, the LEDs are arranged on one side or two opposing sides, serving as incident sides, of a light guide that is formed of a transparent member.

RELATED-ART DOCUMENTS

Patent Documents

Patent Document 1: Japanese Laid-open Patent Publication No. 2009-110783

SUMMARY OF THE INVENTION

Problem to be Solved by the Invention

In the desk lamp disclosed in Patent Document 1, an illumination part is located above a desk and a light emitting surface is directed downward. Therefore, a user may have an oppressive feeling due to the presence of the lamp. In addition, light can be directly perceived by the user, and thus, the user may perceive flicker and get distracted.

It is an object of the present invention to provide a desktop illumination device with less oppressive feeling and less flicker.

Means to Solve the Problem

According to one aspect of the present invention, a desktop illumination device that includes a light source, and a light guide including a light guide plate and configured to guide light emitted from the light source is provided. The light guide plate has a light incident surface on which the light from the light source is incident, a first main surface from which the light entering from the light incident surface is emitted, and a second main surface opposite the first main surface. The first main surface is disposed substantially perpendicularly to an installation surface of the desktop illumination device. An angle at which an intensity becomes maximum in a light distribution of the light emitted from the first main surface is in a range of −90° or more to less than 0°, in a case where an axis passing through a center of the first main surface and perpendicular to the installation surface is defined as a vertical axis, and in a plane including the vertical axis and perpendicular to the installation surface, a direction parallel to the installation surface is defined as vertical 0°, an upward angle with respect to the vertical 0° is defined as a positive angle, and a downward angle with respect to the vertical 0° is defined as a negative angle.

Effects of the Invention

With the above-described configuration, illumination with less oppressive feeling and less flicker can be achieved.

MODE FOR CARRYING OUT THE INVENTION

In embodiments, in order to achieve desktop illumination with less oppressive feeling and less flicker, a light guide that includes a light guide plate and is transparent to visible light is used. A first main surface, serving as a light emitting surface, of the light guide plate is disposed perpendicularly to a desktop illumination device. During the use of the desktop illumination device, a user can see behind the light guide. Therefore, the user can feel less entrapped and less oppressive. Further, by causing light emitted from the light emitting surface to have a predetermined distribution, the emitted light can be prevented from being directly perceived by the user and flicker can be reduced.

Figure 1:
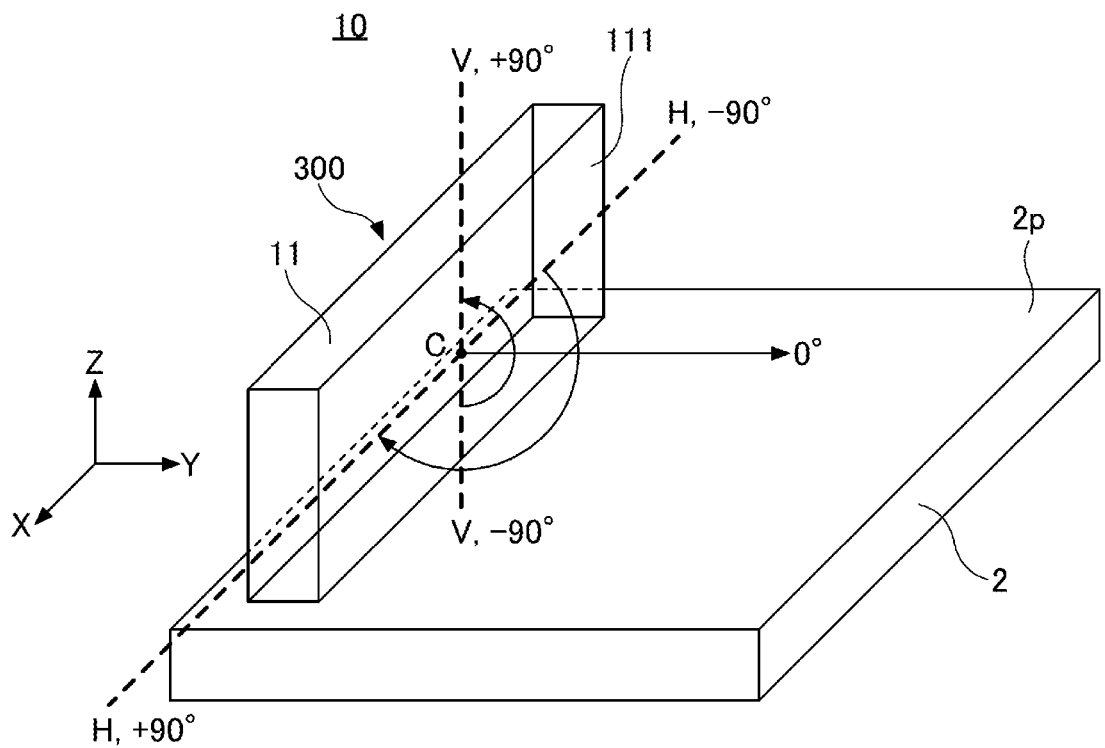
FIG. 1 is an exterior view of a desktop illumination device according to an embodiment.

FIG. 1 is an exterior view of a desktop illumination device 10 according to an embodiment. The desktop illumination device 10 is installed on a desk, table, or the like (hereinafter collectively referred to as a "desk 2"). A surface on which the desktop illumination device 10 is installed is referred to as an "installation surface $2p$". A plane parallel to the installation surface $2p$ is referred to as an X-Y plane, and a direction orthogonal to the X-Y plane is referred to as a Z direction. The height direction of the desktop illumination device 10 is the Z direction and the width direction thereof is an X direction. A light emission direction is referred to as a Y direction.

The desktop illumination device 10 includes a light guide 300. The light guide 300 includes a light guide plate 11 and is configured to guide light from light sources. The light sources are not depicted in FIG. 1. The light sources may be housed in a groove or a slot formed in the installation surface $2p$, or may be placed on the installation surface $2p$ together with the light guide plate 11. An example configuration of the light sources will be described later.

The light guide plate 11 is formed of a solid material that is transparent to visible light, such as glass, plastic, or the like. As a glass material, quartz glass, alkali-free glass, borosilicate glass, or the like can be used. As a plastic material, acrylic resin (such as polymethylmethacrylate (PMMA)), polycarbonate (PC) resin, cycloolefin (COP) resin, or the like may be used. For example, the visible light transmittance of the light guide plate 11 is 60% or more, 65% or more, 70% or more, 75% or more, 80% or more, 85% or more, or 90% or more. The visible light transmittance is specified as the average value of transmittance obtained by measuring the visible light at measurement wavelengths of 380 nm or more to 780 nm or less by a spectrophotometer.

The light guide plate 11 includes a first main surface 111 from which light is emitted. The first main surface 111 is substantially perpendicular to the installation surface $2p$. The term "substantially perpendicular" means that an error of approximately ±5° with respect to the perpendicular direction may be included. The desktop illumination device 10 has a light distribution such that light, emitted from the first main surface 111, is deflected downward relative to the direction parallel to the installation surface $2p$. As long as this light distribution is satisfied, the first main surface 111 may have an error of approximately ±5° with respect to the direction perpendicular to the installation surface $2p$.

An axis passing through a center C of the first main surface 111 and perpendicular to the installation surface $2p$ is defined as a vertical axis or a V-axis. A direction parallel to the installation surface $2p$ is defined as vertical 0° in the Y-Z plane including the V-axis and perpendicular to the installation surface $2p$. In the Y-Z plane, an upward angle with respect to the vertical 0° is defined as a positive angle and a downward angle with respect to the vertical 0° is defined as a negative angle.

In general, considering the light distribution of light emitted from the center C in the X-Z plane perpendicular to the installation surface $2p$, the light can be emitted in the range of −90° to +90°. In Patent Document 1 described above, light is scattered so as to be emitted over a wide range of angles. Conversely, according to the desktop illumination device 10, an angle at which the intensity becomes maximum in the light distribution of light emitted from the center of the first main surface 111 is set to be in the range of −90° or more (for example, more than −90°) to less than 0°. For example, its upper limit is −0.1°, −1°, −5°, −10°, −10°, −20°, −30°, −40°, −50°, −60°, −70°, −80°, −85°, −88°, or −89°, and its lower limit is −90°, −89°, −88°, −85°, −80°, −70°, −60°, −50°, −40°, −30°, −20°, −10°, −5°, or −1°. The value of the lower limit does not exceed the value of the upper limit. Note that the light distribution of emitted light can be measured by using a viewing angle measurement device (for example, luminance/viewing angle meter EZContrast XL88 manufactured by ELDIM).

An axis passing through the center C of the first main surface 111 and parallel to the installation surface $2p$ is defined as a horizontal axis or an H-axis. A direction extending from the center C of the first main surface 111 toward the Y direction is defined as horizontal 0°. A clockwise angle from the horizontal 0° is defined as a positive angle and a counterclockwise angle from the horizontal 0° is defined as a negative angle when the X-Y plane passing through the center C is viewed from the side opposite to the installation surface (or viewed from above). In the X-Y plane, the light distribution of light emitted from the first main surface 111 is in the range of −90° to +90°, and, is for example, in the range of more than −90° to less than +90°. For example, its lower limit is −90°, −89°, −88°, −85°, −80°, −70°, −60°, −50°, −40°, −30°, −20°, or −10°, and its upper limit is +90°, +89°, +88°, +85°, +80°, +70°, +60°, +50°, +40°, +30°, +20°, or +10. Preferably, the desktop illumination device 10 may have a substantially uniform light distribution in the horizontal direction.

Figure 2:
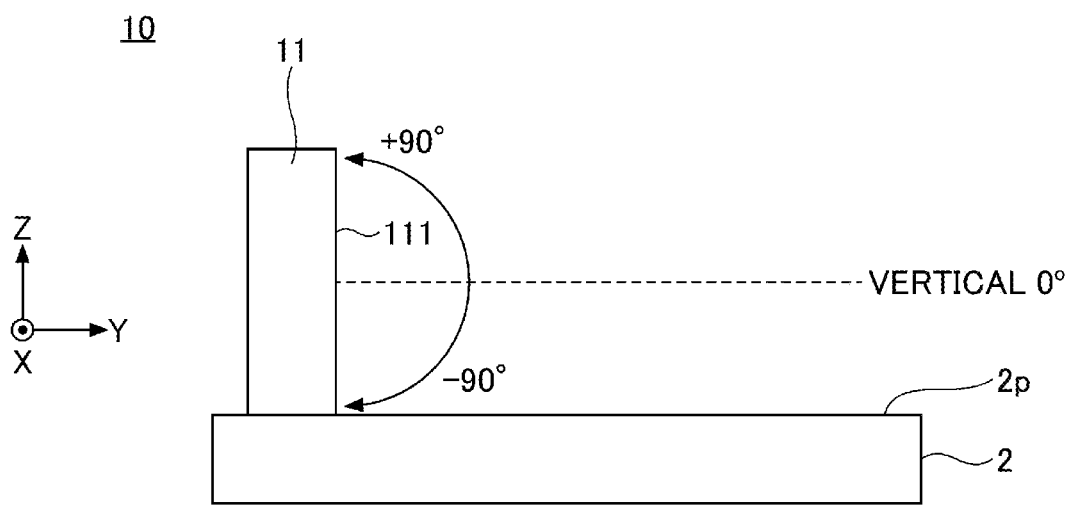
FIG. 2 is a drawing for defining angles in the direction perpendicular to an installation surface.
Figure 3:
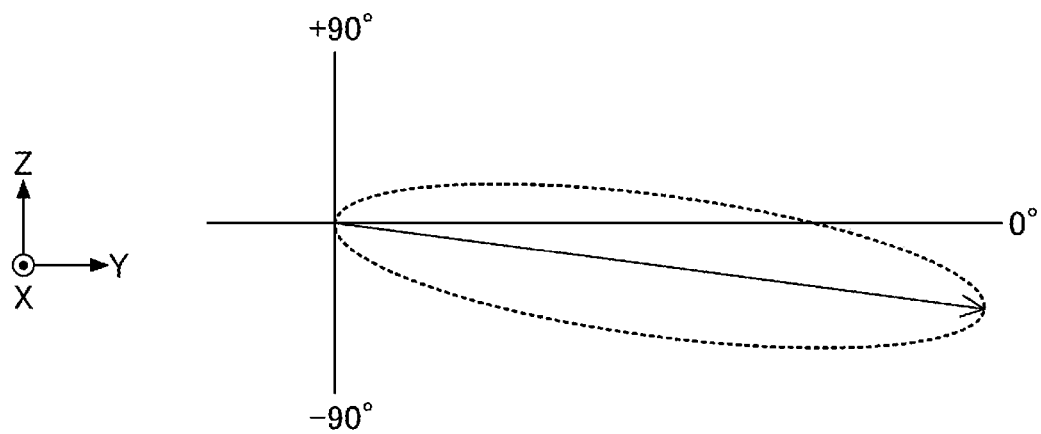
FIG. 3 is a drawing illustrating light distribution characteristics in a Y-Z plane.

FIG. 2 is a drawing for defining angles in the vertical direction of the desktop illumination device 10. FIG. 3 is a drawing illustrating light distribution characteristics in the Y-Z plane. The coordinate system in FIGS. 2 and 3 is the same as that in FIG. 1. In FIG. 2, in the Y-Z plane perpendicular to the installation surface $2p$, a possible angular range in the vertical direction is −90° to +90° in general. As illustrated in FIG. 3, the first main surface 111 of the desktop illumination device 10 according to the embodiment is configured such that an angle at which the intensity becomes maximum in the light distribution of light emitted from the first main surface 111 is in the range of −90° or more to less than 0°.

By setting an angle (that is, an angle indicated by an arrow in FIG. 3) at which the intensity becomes maximum in the light distribution of light emitted from the center of the light emitting surface to be in the range of −90° or more to less than 0°, a work area of the installation surface $2p$ is illuminated with sufficient illuminance, and the emitted light is prevented from entering the user's eyes directly. Accordingly, it is possible to prevent the user from perceiving flicker, thereby suppressing a reduction in work efficiency.

Figure 4:
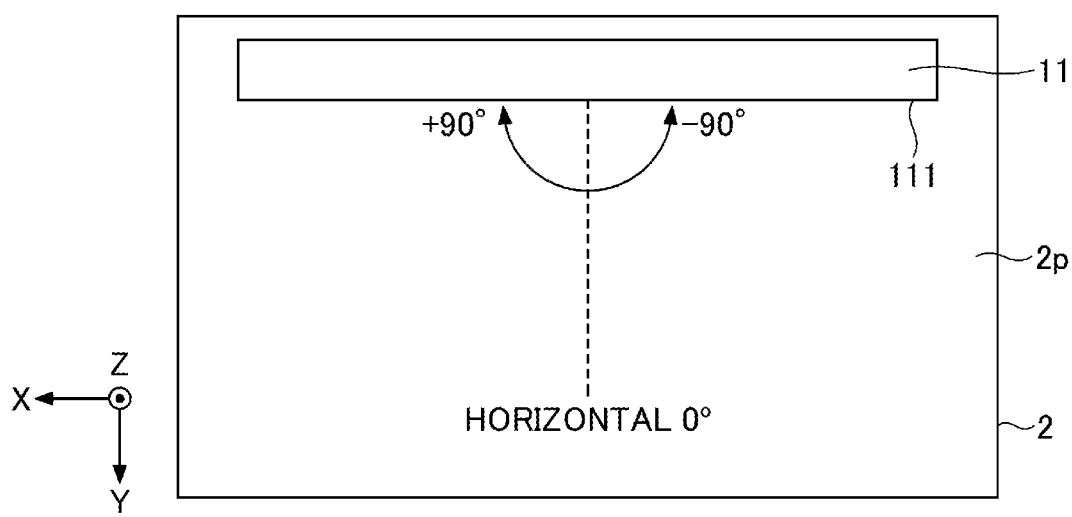
FIG. 4 is a drawing for defining angles in the direction parallel to the installation surface.
Figure 5:
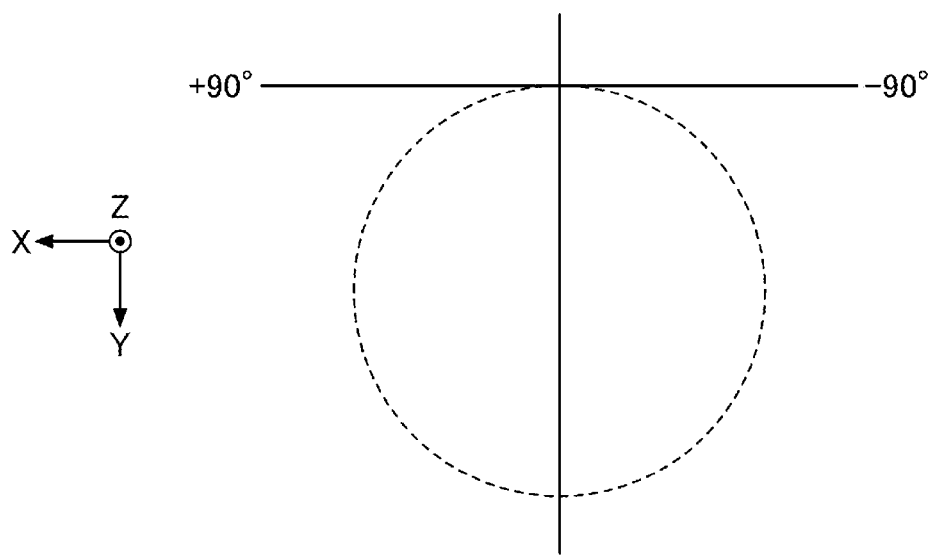
FIG. 5 is a drawing illustrating light distribution characteristics in a X-Y plane.

FIG. 4 is a drawing for defining angles in the horizontal direction of the desktop illumination device 10. FIG. 5 is a drawing illustrating light distribution characteristics in the X-Y plane. The coordinate system in FIGS. 4 and 5 is the same as that in FIG. 1. In FIG. 4, a possible angular range in the horizontal direction is in the range of −90° to +90° in the X-Y plane parallel to the installation surface $2p$. As illustrated in FIG. 5, the first main surface 111 of the desktop illumination device 10 is configured such that the light distribution of light emitted from the first main surface 111 is in the range of −90° to +90° in the horizontal direction.

By setting the light distribution to be in the range of −90° to +90° in the horizontal direction, the work area of the installation surface $2p$ can be substantially uniformly illuminated, thereby improving the work efficiency of the user.

Figure 6:
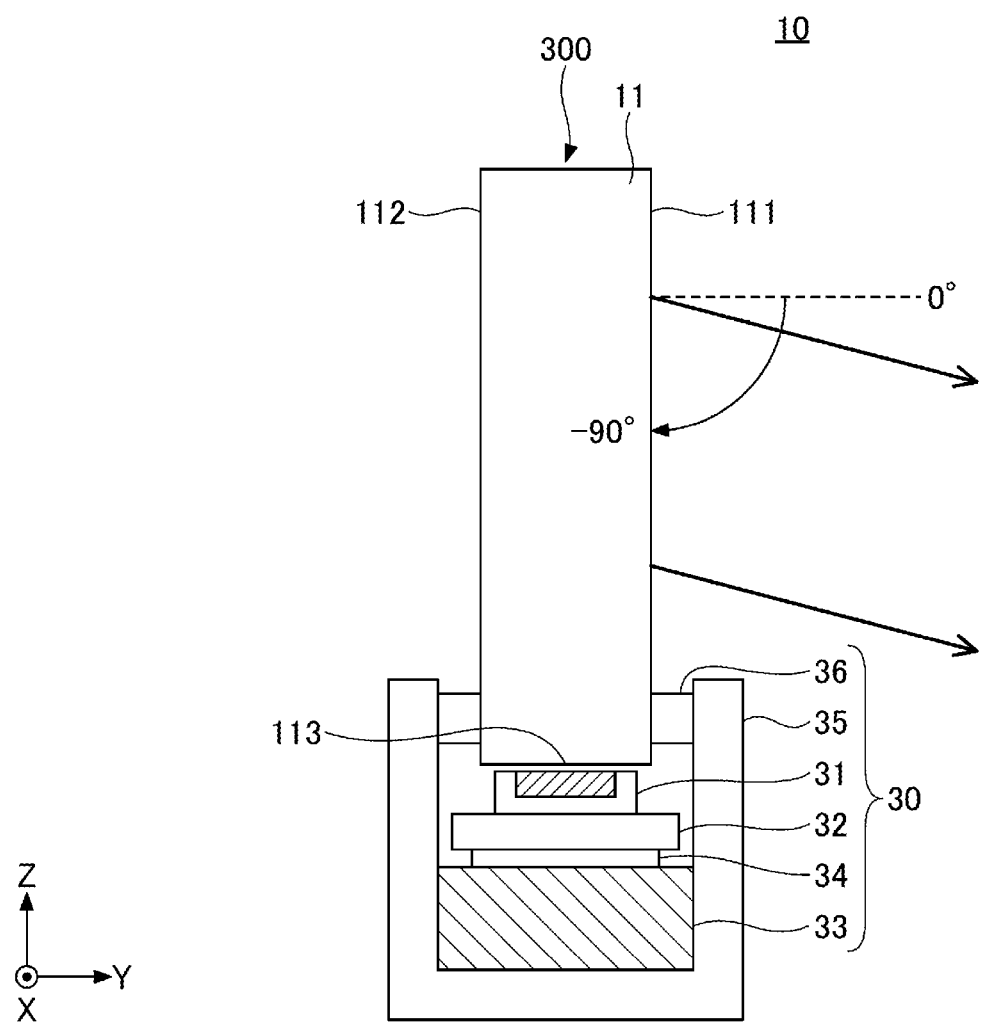
FIG. 6 is a drawing illustrating an example configuration of a light source part.

FIG. 6 is a drawing illustrating an example configuration of a light source part 30 of the desktop illumination device 10. Before describing the configuration of the light source part 30, the overall configuration of the desktop illumination device 10 will be briefly described. The desktop illumination device 1 includes the light source part 30 and the light guide 300. The light guide 300 includes the light guide plate 11 and is configured to guide light emitted from the light source part 30. The light guide plate 11 includes a light incident surface 113 on which light from the light source part 30 is incident, the first main surface 111 from which light entering from the light incident surface 113 is emitted to the outside, and a second main surface 112 opposite the first main surface.

As described above, the first main surface 111 is configured such that light is emitted in the range of −90° or more to less than 0° in the vertical direction. It is more preferable to configure the first main surface 111 such that light is emitted in the range of −90° to +90° in the horizontal direction.

In the example of FIG. 6, the light incident surface 113 is positioned at the lower end of the light guide plate 11 in the Z direction, and the light source part 30 is disposed below the light guide plate 11. As will be described later, the light source part 30 is not necessarily disposed as illustrated in FIG. 6, and may be disposed at the side end of the light guide plate 11.

The light source part 30 includes, for example, light emitting elements 31 housed in a housing 35. The light emitting elements 31 serve as light sources. The light emitting elements 31 may be mounted on a substrate 32 and fixed to a heat dissipator 33 with a thermally conductive double-sided tape 34. Instead of the light emitting elements, an organic electroluminescent (EL) light emitter or an inorganic EL light emitter capable of surface light emission, or a linear light source such as a fluorescent lamp or a cold cathode tube may be used.

The light guide plate 11 is held in the housing 35 by a holding member 36 such that the first main surface 111 is substantially perpendicular to the installation surface of the desktop illumination device 10. The light source part 30 may be housed, together with the housing 35, in a groove or a slot formed in the desk 2, or may be placed on the surface of the desk 2 together with the housing 35.

<Example Configuration of Light Guide>

Figure 7A:
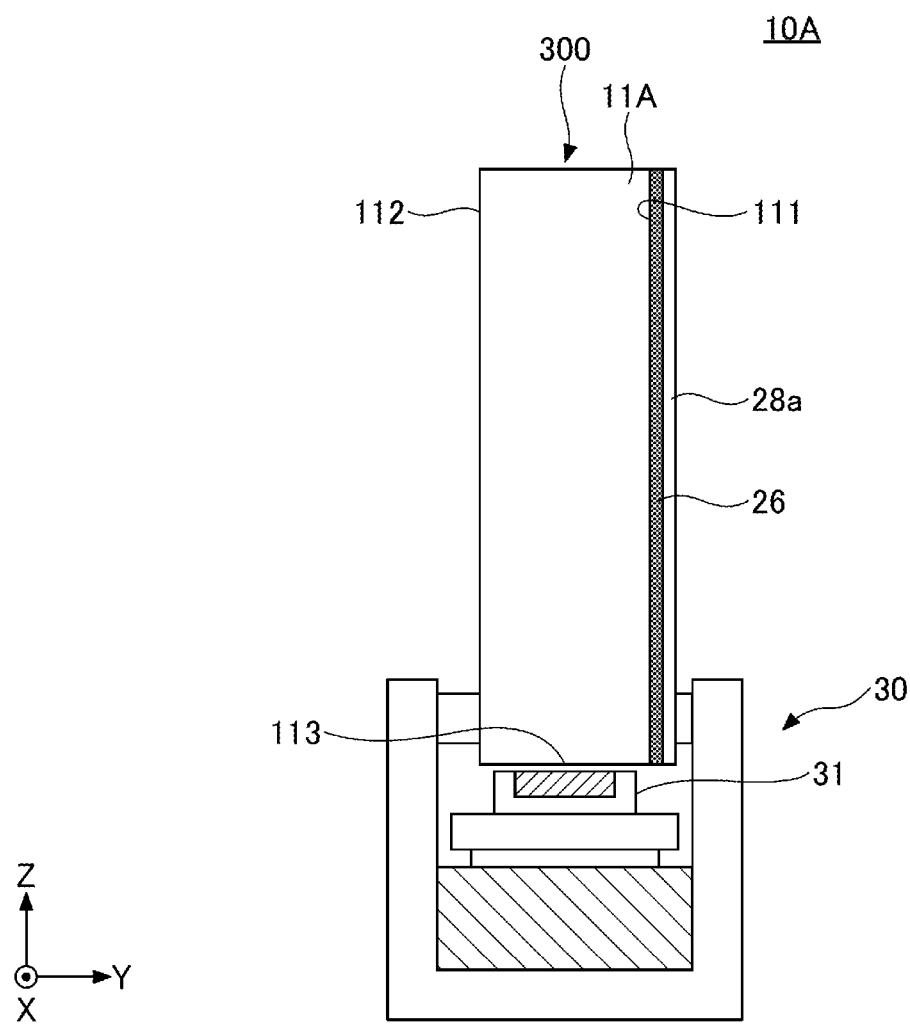
FIG. 7A is a drawing illustrating an example configuration of a light guide plate.
Figure 7B:
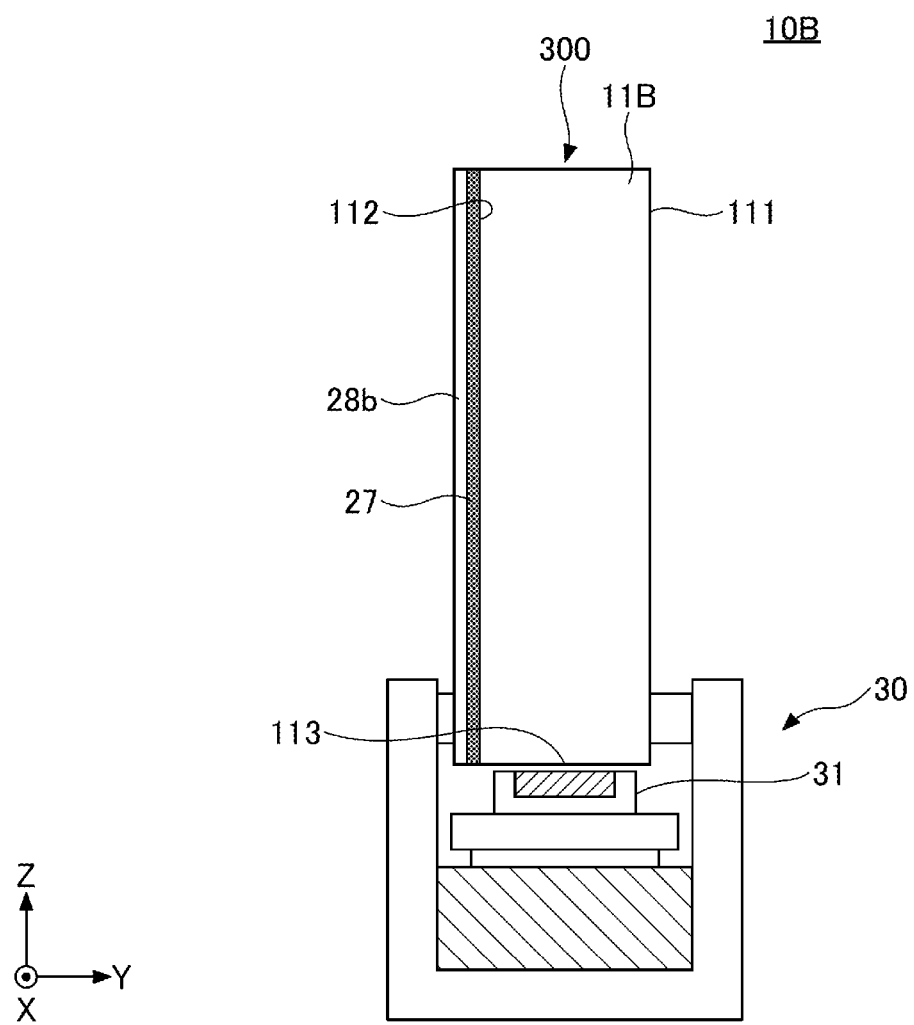
FIG. 7B is a drawing illustrating another example configuration of the light guide plate.
Figure 7C:
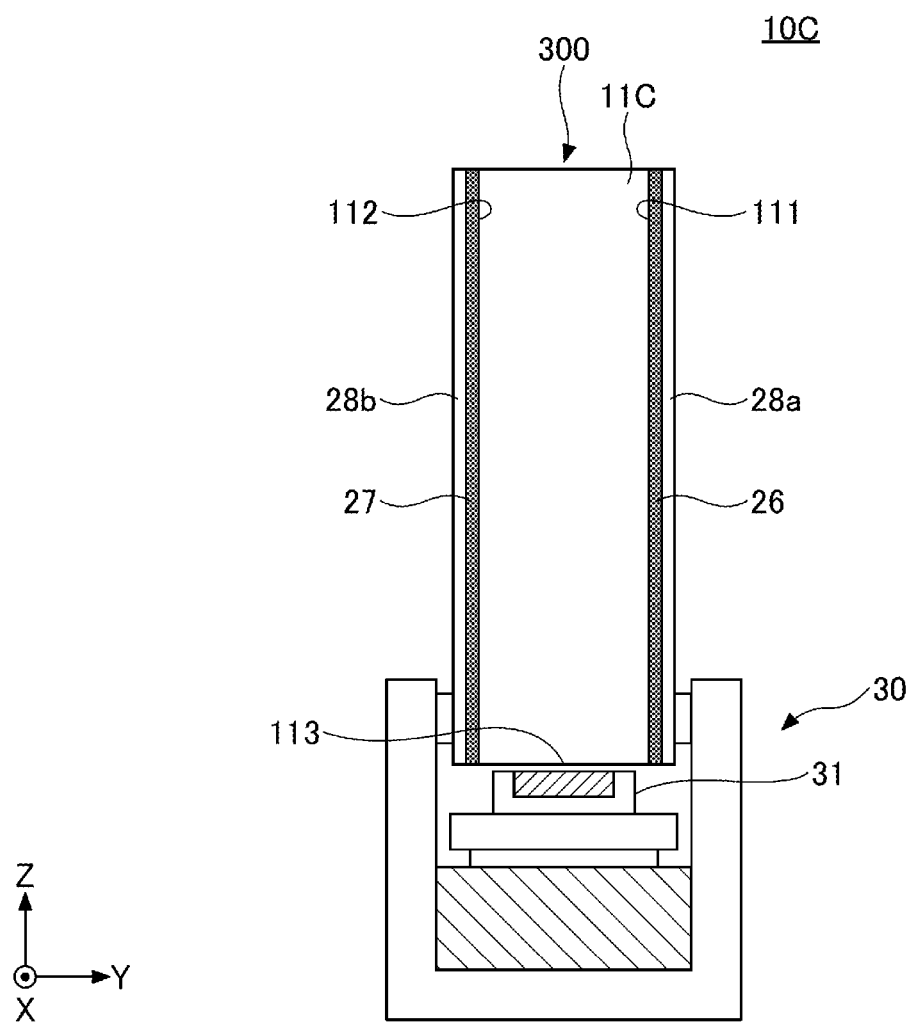
FIG. 7C is a drawing illustrating another example configuration of the light guide plate.

Next, an example configuration of the light guide 300 will be described. In FIGS. 7A through 7C, the light guide 300 includes a low refractive index layer having a lower refractive index than that of the light guide plate 11 on at least either the first main surface 111 or the second main surface 112. The low refractive index layer is a layer having a lower refractive index than the refractive index of the light guide plate 11. In a case where the light guide plate 11 is composed mainly of PMMA, a refractive index $n_1$ of the light guide plate 11 is approximately 1.49. In this case, a refractive index $n_2$ of the low refractive index layer is preferably 1.30 or less, and is more preferably 1.20 or less. The low refractive index layer is not particularly limited; however, a low refractive index layer that includes voids as disclosed in International Publication Pamphlet No. WO2019/146628 can be used, the entire contents of which are incorporated herein by reference.

The visible light transmittance of the light guide 300, including the light guide plate 11 and the low refractive index layer, is, for example, 60% or more, 65% or more, 70% or more, 75% or more, 80% or more, 85% or more, or 90% or more. The visible light transmittance can be specified as the average value of transmittance obtained by measuring the visible light at measurement wavelengths of 380 nm or more to 780 nm or less by a spectrophotometer.

In FIG. 7A, a desktop illumination device 10A includes the light source part 30 and the light guide 300 that includes a light guide plate 11A. The light source part 30 includes the light emitting elements 31 that emit light toward the light guide plate 11A. The light source part 30 may have any other configuration, and, for example, the configuration of FIG. 6 can be employed.

The light guide plate 11A includes the light incident surface 113 facing the light emitting elements 31, the first main surface 111, and the second main surface 112. A low refractive index layer 26 is provided on the first main surface 111. The low refractive index layer 26 may be covered by a cover layer 28a.

Light entering the light guide plate 11A from the light incident surface 113 is propagated through the light guide plate 11A in the Z direction while being totally reflected between the first main surface 111, on which the low refractive index layer 26 is provided, and the second main surface 112. Among light entering the interface between the first main surface 111 and the low refractive index layer 26, light that does not satisfy the condition of total reflection is emitted from the first main surface 111, such that an angle at which the intensity becomes maximum in the light distribution of light emitted from the center of the first main surface 111 is in the range of −90° or more to less than 0° in the Y-Z plane. In the horizontal direction (in the X-Y plane), the light distribution of the emitted light may be in the range of −90° to +90°.

By providing the low refractive index layer 26 on the first main surface 111, loss of light due to dirt or scratches of the light emitting surface can be reduced.

In FIG. 7B, a desktop illumination device 10B includes the light source part 30 and the light guide 300 that includes a light guide plate 11B. The light source part 30 includes the light emitting elements 31 that emit light toward the light guide plate 11B. The light source part 30 may have any other configuration, and, for example, the configuration of FIG. 6 can be employed.

The light guide plate 11B includes the light incident surface 113 facing the light emitting elements 31, the first main surface 111, and the second main surface 112. A low refractive index layer 27 is provided on the second main surface 112. The low refractive index layer 27 may be covered by a cover layer 28b.

Light entering the light guide plate 11B from the light incident surface 113 is propagated through the light guide plate 11B in the Z direction while being totally reflected between the first main surface 111 and the second main surface 112 on which the low refractive index layer 27 is provided. Among light entering the first main surface 111, light that does not satisfy the condition of total reflection is emitted from the first main surface 111, such that an angle at which the intensity becomes maximum in the light distribution of light emitted from the center of the first main surface 111 is in the range of −90° or more to less than 0° in the Y-Z plane. In the horizontal direction (in the X-Y plane), the light distribution of the emitted light may be in the range of −90° to +90°.

By providing the low refractive index layer 27 on the second main surface 112, loss of light due to dirt or scratches of the second main surface 112 can be reduced, and thus, light can be efficiently directed toward the first main surface 111.

In FIG. 7C, a desktop illumination device 100 includes the light source part 30 and the light guide 300 that includes a light guide plate 11C. The light source part 30 includes the light emitting elements 31 that output light to the light guide plate 11C. The light source part 30 may have any other configuration, and, for example, a configuration similar to that of FIG. 6 can be employed.

The light guide plate 11C includes the light incident surface 113 facing the light emitting elements 31, the first main surface 111, and the second main surface 112. The low refractive index layer 26 is provided on the first main surface 111, and the low refractive index layer 27 is provided on the second main surface 112. The low refractive index layer 26 and the low refractive index layer 27 may be covered by the cover layer 28a and the cover layer 28b, respectively.

Light entering the light guide plate 11C from the light incident surface 113 is propagated through the light guide plate 11C in the Z direction while being totally reflected between the first main surface 111 on which the low refractive index layer 26 is provided and the second main surface 112 on which the low refractive index layer 27 is provided. Among light entering the interface between the first main surface 111 and the low refractive index layer 26, light that does not satisfy the condition of total reflection is emitted from the first main surface 111 such that an angle at which the intensity becomes maximum in the light distribution of light emitted from the center of the first main surface 111 is in the range of −90° or more to less than 0° in the Y-Z plane. In the horizontal direction (in the X-Y plane), the light distribution of the emitted light may be in the range of −90° to +90°.

By providing the low refractive index layer 26 and the low refractive index layer 27 on the first main surface 111 and the second main surface 112, respectively, loss of light due to dirt or scratches of the main surfaces of the light guide plate 11C can be reduced.

Figure 8:
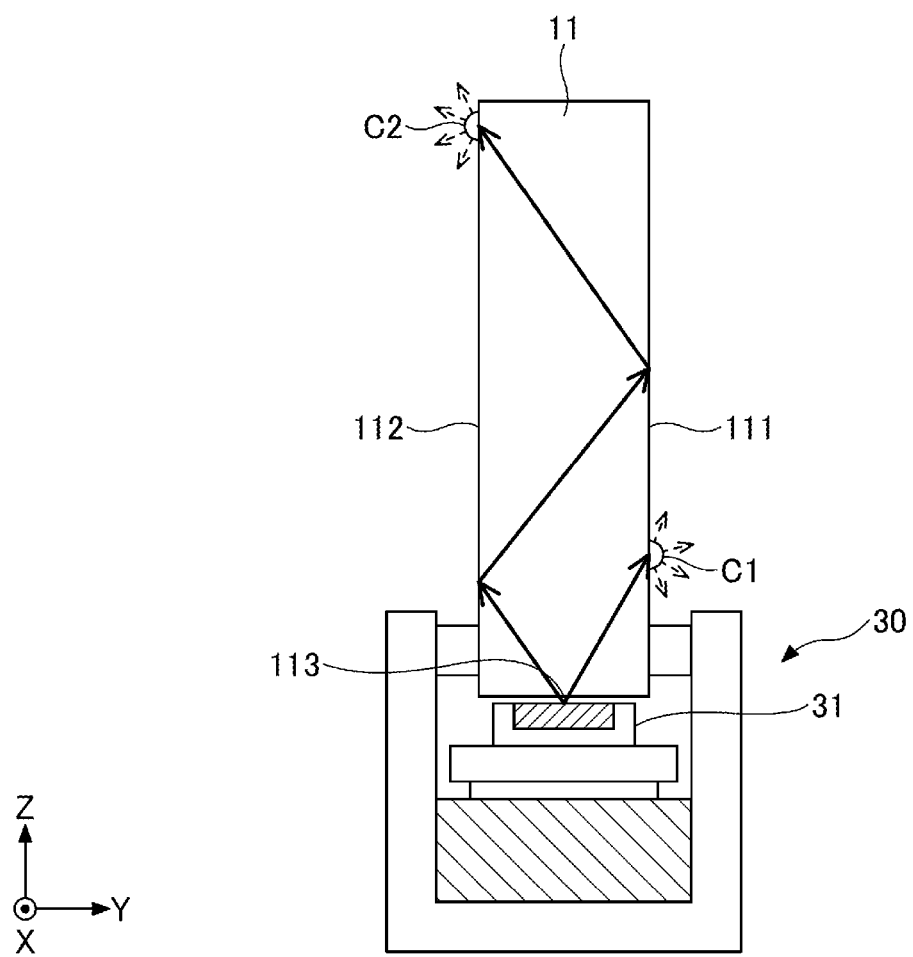
FIG. 8 is a drawing illustrating the significance of providing a low refractive index layer.

FIG. 8 is a drawing illustrating the significance of providing the low refractive index layer 26 or 27. It is assumed that dirt C1 or C2 such as sebum or sweat adheres to the first main surface 111 or the second main surface 112. Among light propagating in the Z direction while being totally reflected between the first main surface 111 and the second main surface 112, light incident on a position where the dirt C1 or C2 adheres would be scattered by the dirt C1 or C2 and would be lost before being emitted from the first main surface 111.

By providing the low refractive index layer 26 or 27 on at least either the first main surface 111 or the second main surface 112, light propagating through the inside of the light guide plate 11 can be prevented from being lost due to scattering or the like, and thus, a high light emission efficiency from the first main surface 111 can be maintained.

<Example Configuration of Light Emitting Surface>

Figure 9:
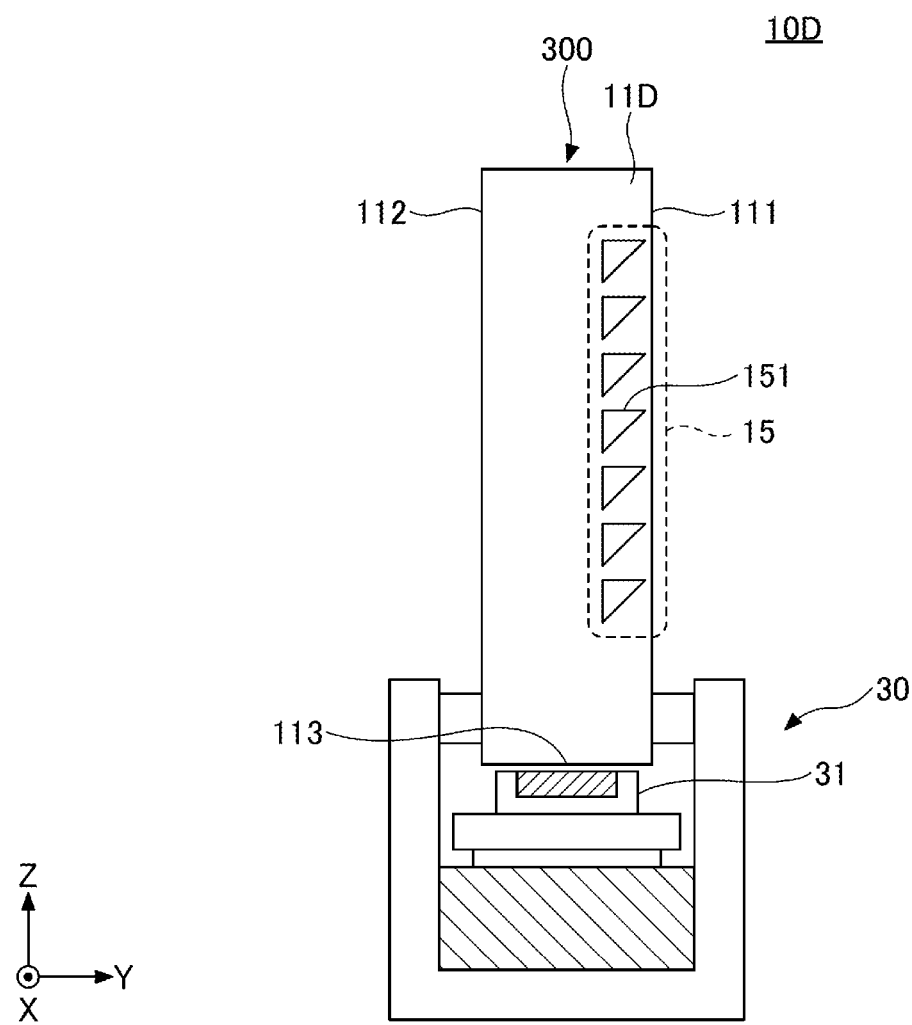
FIG. 9 is a drawing illustrating yet another example configuration of the light guide plate.

Next, an example configuration of the light emitting surface of the light guide plate 11 is illustrated. FIG. 9 is a schematic view of a desktop illumination device 10D. The desktop illumination device 10D includes the light source part 30 and the light guide 300 that includes a light guide plate 11D. The light source part 30 has, for example, the configuration described with reference to FIG. 6.

The light guide 300 includes a light extractor 15 having one or more optical cavities 151 provided in the light guide plate 11D. The light extractor 15 is provided along the first main surface 111. The optical cavities 151 are voids filled with a material having a lower refractive index than that of the light guide plate 11D. If the optical cavities 151 are voids filled with air, the optical cavities 151 are air cavities. Instead of air, the optical cavities 151 may be filled with a gas, a liquid, or a solid material having a lower refractive index than that of the light guide plate 11D. The optical cavities 151 are designed such that light, entering the interfaces of the optical cavities 151 from the light guide plate 11D, is totally reflected toward the first main surface 111 and an angle at which the intensity becomes maximum in the light distribution of light emitted from the center of the first main surface 111 is in the range of −90° or more to less than 0° in the Y-Z plane.

The visible light transmittance of the light guide 300 including the light guide plate 11D and the light extractor 15 is 60% or more, 65% or more, 70% or more, 75% or more, 80% or more, 85% or more, or 90% or more. The visible light transmittance is specified as the average value of transmittance obtained by measuring the visible light at measurement wavelengths of 380 nm or more to 780 nm or less by a spectrophotometer.

In the light guide plate 11D, the plurality of optical cavities 151 are regularly or randomly provided along the flat first main surface 111. The size of the optical cavities 151 can be selected appropriately within a range that allows the optical cavities 151 to be provided inside the light guide plate 11D. Examples of the light guide plate including the optical cavities include, without limitation, light guide plates disclosed in International Publication Pamphlet No. WO2011/124765, International Publication Pamphlet No. WO2011/127187, International Publication Pamphlet No. WO2019/087118, and International Publication Pamphlet No. WO2019/182091, the entire contents of which are incorporated herein by reference.

The light guide plate 11D including the optical cavities 151 inside may be produced by bonding together a light guide layer, having a desired cavity pattern formed on a surface thereof, and a flat light guide layer without a cavity pattern. The light guide layers may be bonded by an adhesive-free lamination method such as microwave surface treatment, or may be pressure-bonded with an adhesive (including a pressure-sensitive adhesive). In order to reduce reflection at the interface between the light guide layers, it is preferable for the refractive indices of the light guide layers bonded together to be substantially the same. If an adhesive is used, it is preferable for the refractive index of the adhesive to be substantially the same as the refractive indices of the light guide layers.

For the formation of a cavity pattern on the light guide layer, laser patterning, direct laser imaging, laser drilling, masked or maskless laser irradiation, or electron beam radiation may be performed. As another method, individual characteristics (changes in refractive index values or the like) may be applied to a portion, where the optical cavities 151 are to be formed, by using printing, inkjet printing, screen printing, or the like. Micro-dispensing/nano-dispensing, dosing, direct writing, discrete laser sintering, micro-electrical discharge machining (micro-EDM), micro-machining, micro-molding, imprinting, embossing, or any other similar method may be used.

The light guide plate 11D allows light, entering the light guide plate 11D from the light incident surface 113, to propagate in the Z direction by total reflection and to be emitted from the first main surface 111 with the above-described light distribution.

Figure 10:
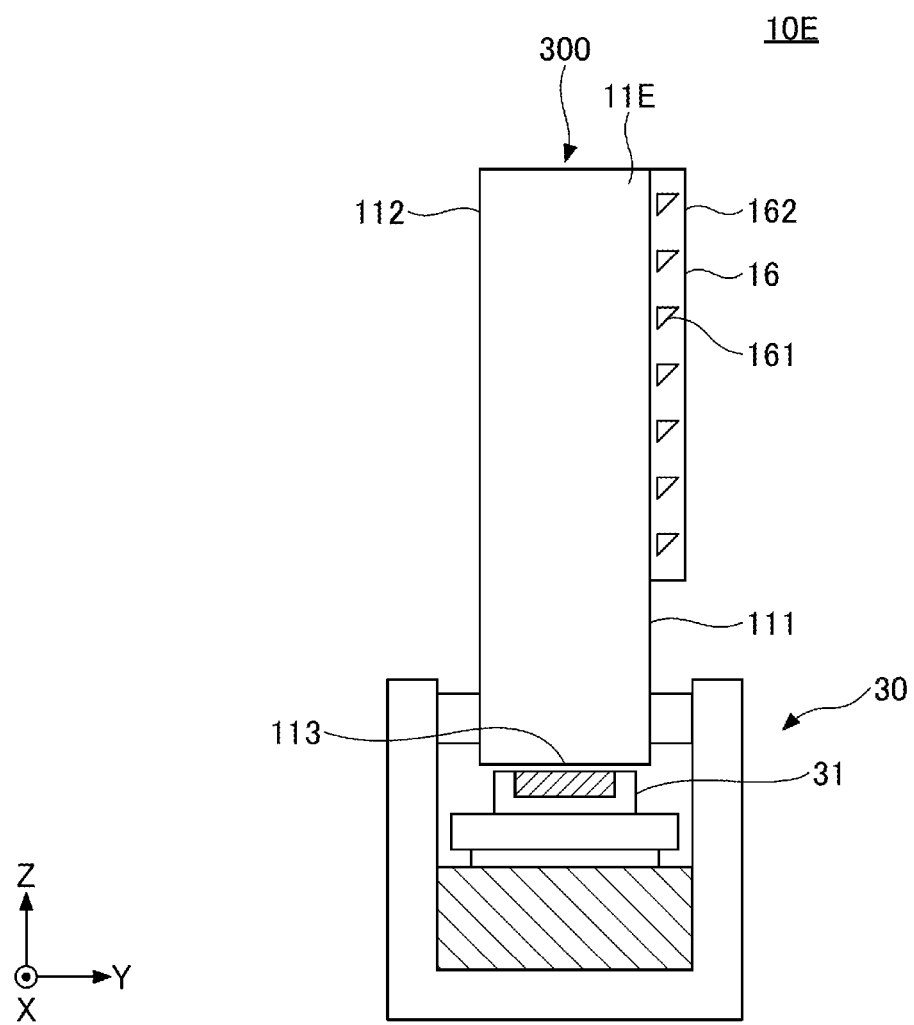
FIG. 10 is a drawing illustrating yet another example configuration of the light guide plate.

FIG. 10 is a schematic view of a desktop illumination device 10E. The desktop illumination device 10E includes the light source part 30 and the light guide 300 that includes a light guide plate 11E. The light guide plate 11E includes a light extracting layer 16, functioning as a light extractor, on the first main surface 111. One or more optical cavities 161 are formed in the light extracting layer 16.

Similar to the light guide plate 11D of FIG. 9, the light extracting layer 16 having the optical cavities 161 can be formed by bonding together a flat light guide layer without a cavity pattern and a light guide layer having a cavity pattern formed on a surface thereof. Alternatively, a light guide layer having a cavity pattern may be directly bonded to the first main surface 111.

It is desirable for the refractive index of the light extracting layer 16 to be the same as or close to the refractive index of the light guide plate 11E so as to reduce undesired refraction and reflection. For example, if the light guide plate 11E is formed of polymethylmethacrylate (PMMA), the light extracting layer 16 is formed of a material having a refractive index that is the same as or close to the refractive index of the PMMA.

Light, entering the light extracting layer 16 from the light guide plate 11E, is totally reflected by the interfaces of the optical cavities 161, and is emitted from an outermost surface 162 of the light extracting layer 16. The interfaces of the optical cavities 161 are designed as follows. Light entering from the light guide plate 11E is totally reflected toward the outermost surface 162 of the light extracting layer 16, and is emitted such that an angle at which the intensity becomes maximum in the light distribution of light emitted from the center of the first main surface 111 is in the range of −90° or more to less than 0° in the Y-Z plane.

The light guide plate 11E allows light, entering the light guide plate 11E from the light incident surface 113, to propagate in the Z direction by total reflection and to be emitted from the light extracting layer 16 with the above-described light distribution.

Figure 11:
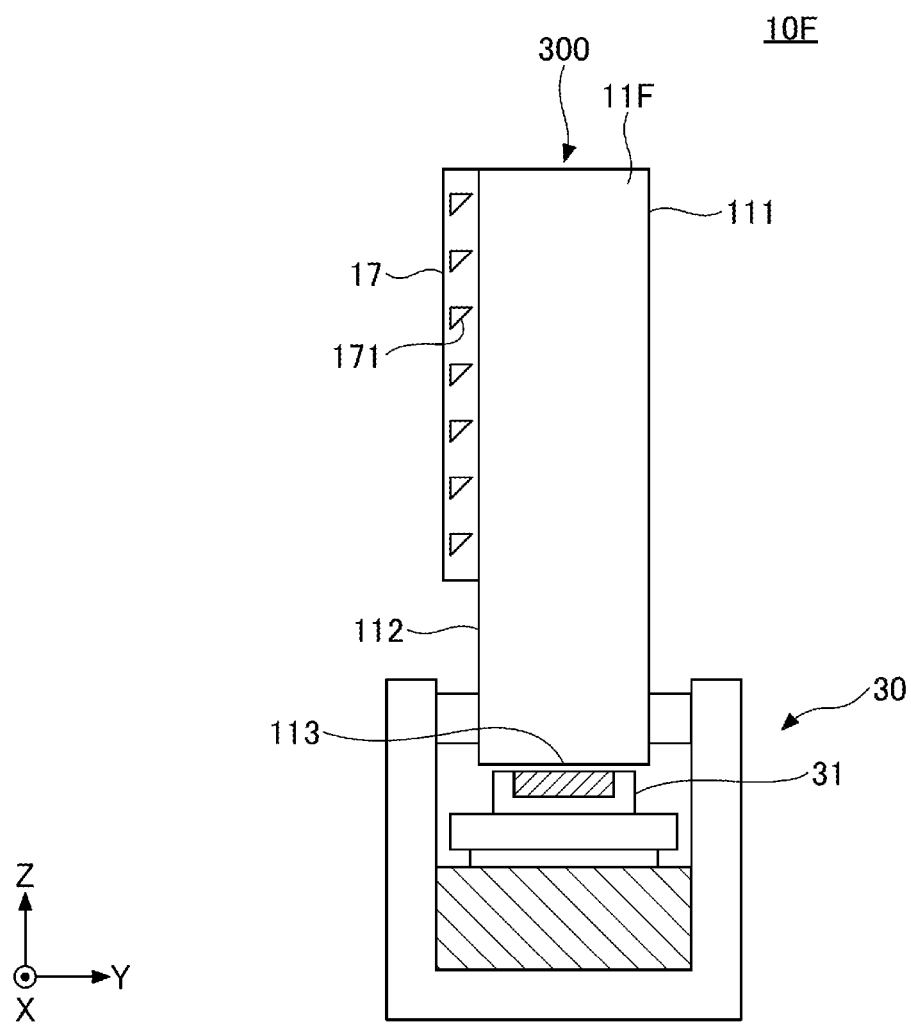
FIG. 11 is a drawing illustrating yet another example configuration of the light guide plate.

FIG. 11 is a schematic view of a desktop illumination device 10F. The desktop illumination device 10F includes the light source part 30 and the light guide 300 that includes a light guide plate 11F. The light guide plate 11F includes a light extracting layer 17, functioning as a light extractor, on the second main surface 112. One or more optical cavities 171 are formed in the light extracting layer 17.

Similar to the light guide plate 11D of FIG. 9 and the light extracting layer 16 of FIG. 10, the light extracting layer 17 having the optical cavities 171 can be formed by bonding together a flat light guide layer without a cavity pattern and a light guide layer having a cavity pattern formed on a surface thereof. Alternatively, a light guide layer having a cavity pattern may be directly bonded to the second main surface 112.

It is desirable for the refractive index of the light extracting layer 17 to be the same as or close to the refractive index of the light guide plate 11F so as to reduce undesired refraction and reflection. For example, if the light guide plate 11F is formed of polymethylmethacrylate (PMMA), the light extracting layer 17 is formed of a material having a refractive index that is the same as or close to the refractive index of the PMMA.

Light, entering the light extracting layer 17 from the light guide plate 11F, is totally reflected by the interfaces of the optical cavities 171 and is directed toward the first main surface 111. As described above, the first main surface 111 is configured such that an angle at which the intensity becomes maximum in the light distribution of light emitted from the center of the first main surface 111 is in the range of −90° or more to less than 0° in the Y-Z plane.

The light guide plate 11F allows light, entering the light guide plate 11F from the light incident surface 113, to propagate in the Z direction by total reflection, to be directed from the light extracting layer 17 toward the first main surface 111, and to be emitted from the first main surface 111 with the above-described predetermined light distribution.

According to any of the configurations in FIGS. 9 through 11, emitted light rays can be prevented from entering the user's eyes directly and flicker can be reduced, while illuminating the work area with sufficient illuminance.

Figure 12:
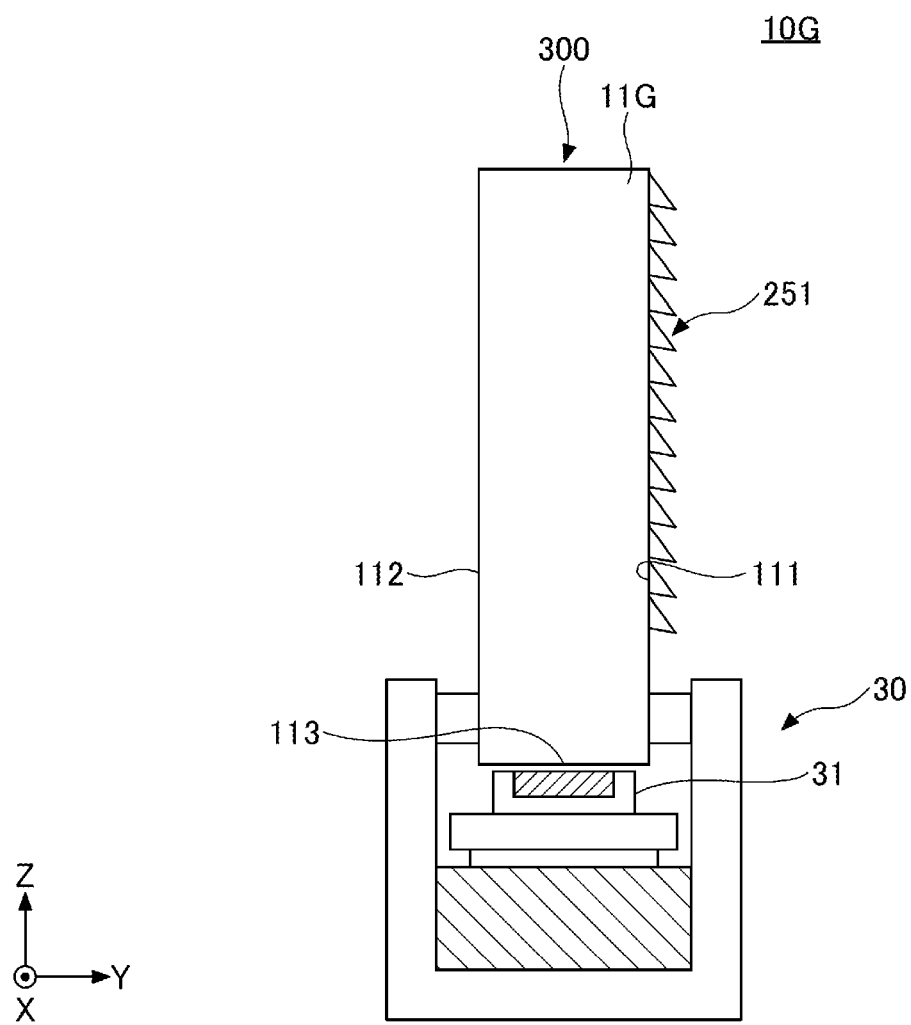
FIG. 12 is a drawing illustrating yet another example configuration of the light guide plate.

FIG. 12 is a schematic view of a desktop illumination device 10G. The desktop illumination device 10G includes the light guide 300 that includes a light guide plate 11G. The light guide plate 11G includes a prism part 251, which functions as a light extractor, on the first main surface 111. As the prism part 251, a prism sheet may be bonded to the first main surface 111, for example. In this case, the refractive index of the prism sheet is desirably the same as or close to the refractive index of the light guide plate 11G.

The size, the number of inclined surfaces, and the like of the prism part 251 can be selected appropriately within a range that allows the prism part 251 to be provided on the first main surface 111. Light, entering the prism part 251 from the light guide plate 11G, is refracted by the prism part 251 and emitted from the light guide plate 11G. The angle and pitch of the inclined surfaces of the prism part 251 are designed such that an angle at which the intensity becomes maximum in the light distribution of light emitted from the center of the first main surface 111 is in the range of −90° or more to less than 0° in the Y-Z plane, as described above.

Figure 13:
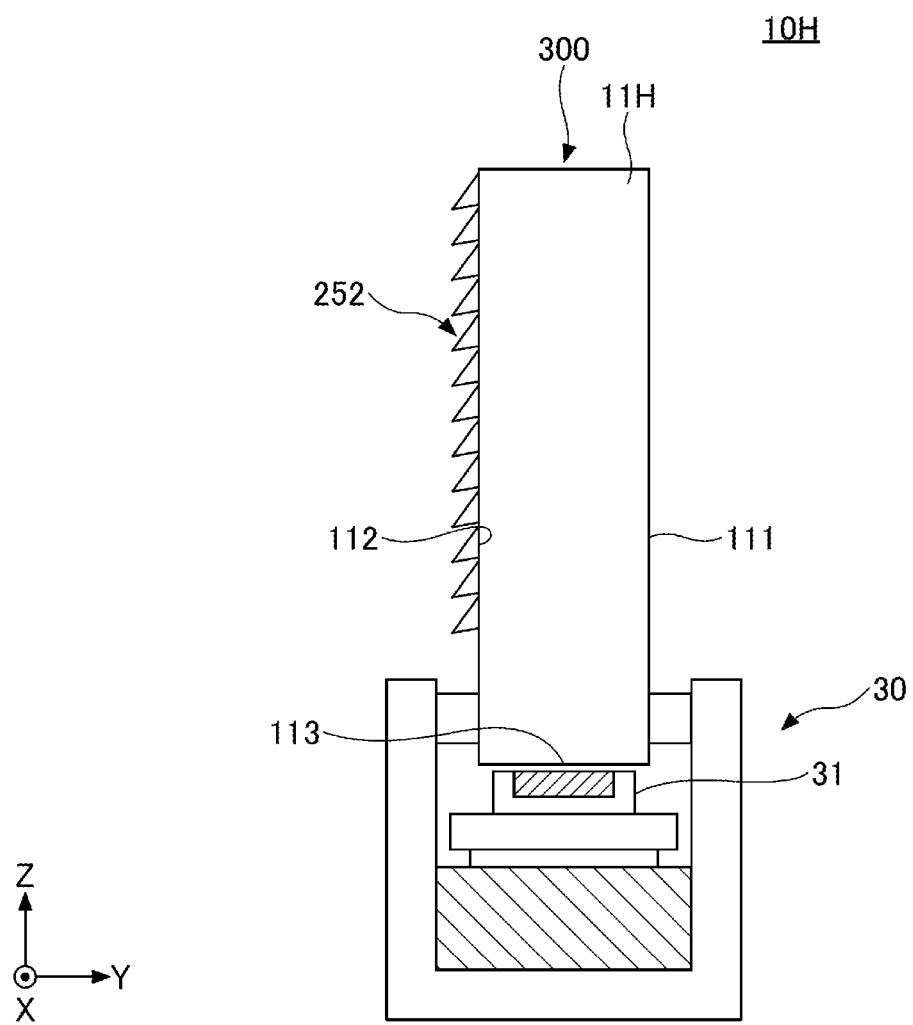
FIG. 13 is a drawing illustrating yet another example configuration of the light guide plate.

FIG. 13 is a schematic view of a desktop illumination device 10H. The desktop illumination device 10H includes the light guide 300 that includes a light guide plate 11H. The light guide plate 11H includes a prism part 252, functioning as a light extractor, on the second main surface 112. As the prism part 252, a prism sheet may be bonded to the second main surface 112, for example. In this case, the refractive index of the prism sheet is desirably the same as or close to the refractive index of the light guide plate 11H.

The size, the number of inclined surfaces, and the like of the prism part 252 can be selected appropriately within a range that allows the prism part 252 to be provided on the second main surface 112. Light, entering the prism part 252 from the light guide plate 11H, is refracted by the prism part 252 toward the first main surface 111 and emitted from the first main surface 111. The angle and pitch of the inclined surfaces of the prism part 252 are designed such that an angle at which the intensity becomes the maximum in the light distribution of light emitted from the center of the first main surface 111 is in the range of −90° or more to less than 0° in the Y-Z plane, as described above.

According to the configurations in FIGS. 12 and 13 as well, emitted light rays can be prevented from entering the user's eyes directly and flicker can be reduced, while illuminating the work area with sufficient illuminance.

Figure 14:
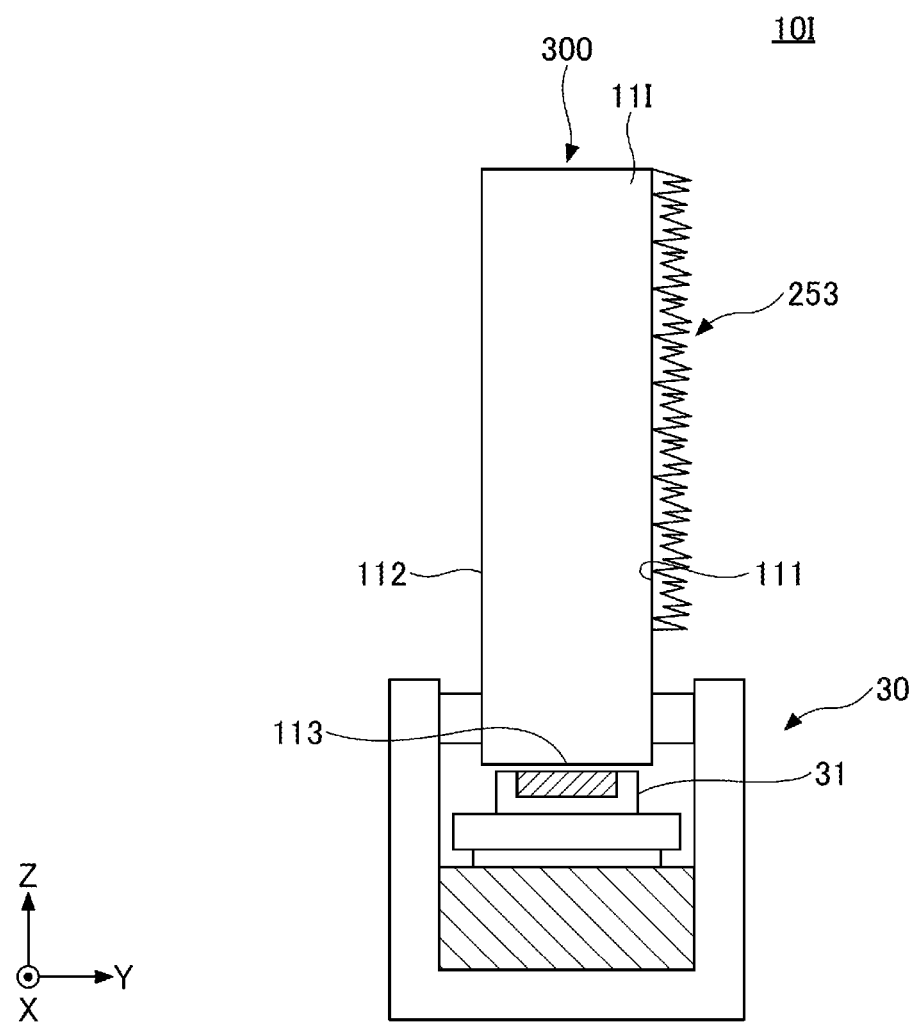
FIG. 14 is a drawing illustrating yet another example configuration of the light guide plate.

FIG. 14 is a schematic view of a desktop illumination device 10I. The desktop illumination device 10I includes the light guide 300 that includes a light guide plate 11I. The light guide plate 11I includes an uneven part 253, functioning as a light extractor, on the first main surface 111. The uneven part 253 includes a plurality of projections and recesses each having a width (or a diameter) and a height of approximately 1 μm to 5 μm. The uneven part 253 is designed such that an angle at which the intensity becomes maximum in the light distribution of light emitted from the center of the first main surface 111 is in the range of −90° or more to less than 0° in the Y-Z plane, as described above. As the uneven part 253, an optical film, having projections and recesses satisfying the above-described conditions, may be used.

Figure 15:
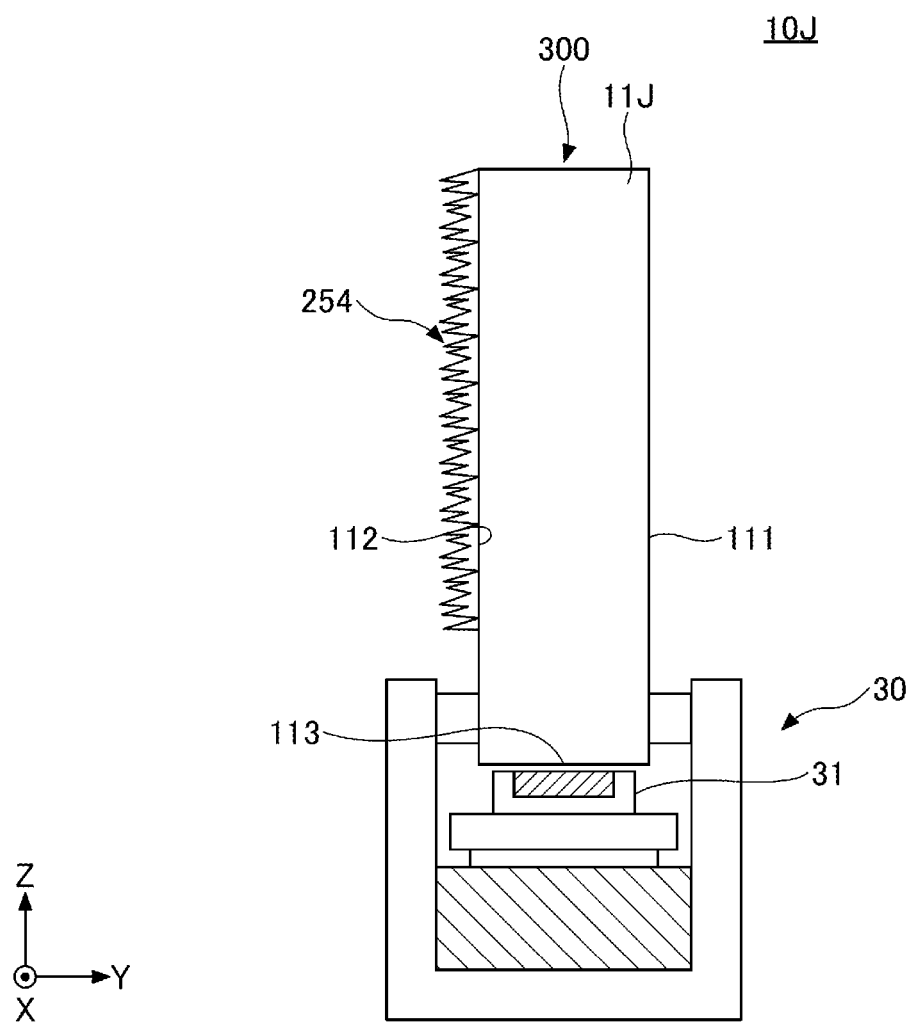
FIG. 15 is a drawing illustrating yet another example configuration of the light guide plate.

FIG. 15 is a schematic view of a desktop illumination device 10J. The desktop illumination device 10J includes the light guide 300 that includes a light guide plate 11J. The light guide plate 11J includes an uneven part 254, functioning as a light extractor, on the second main surface 112. The uneven part 254 includes a plurality of projections and recesses each having a width (or a diameter) and a height of approximately 1 μm to 5 μm. The uneven part 254 causes light, entering the uneven part 254 from the light guide plate 11J, to be deflected toward the first main surface 111 and emitted from the first main surface 111. The uneven part 254 is designed such that an angle at which the intensity becomes maximum in the light distribution of light emitted from the center of the first main surface 111 is in the range of −90° or more to less than 0° in the Y-Z plane. As the uneven part 254, an optical film, having projections and recesses satisfying the above-described conditions, may be used.

According to the configurations in FIGS. 14 and 15 as well, emitted light rays can be prevented from entering the user's eyes directly and flicker can be reduced, while illuminating the work area with sufficient illuminance.

<Usage Scenarios of Desktop Illumination Device>

Figure 16:
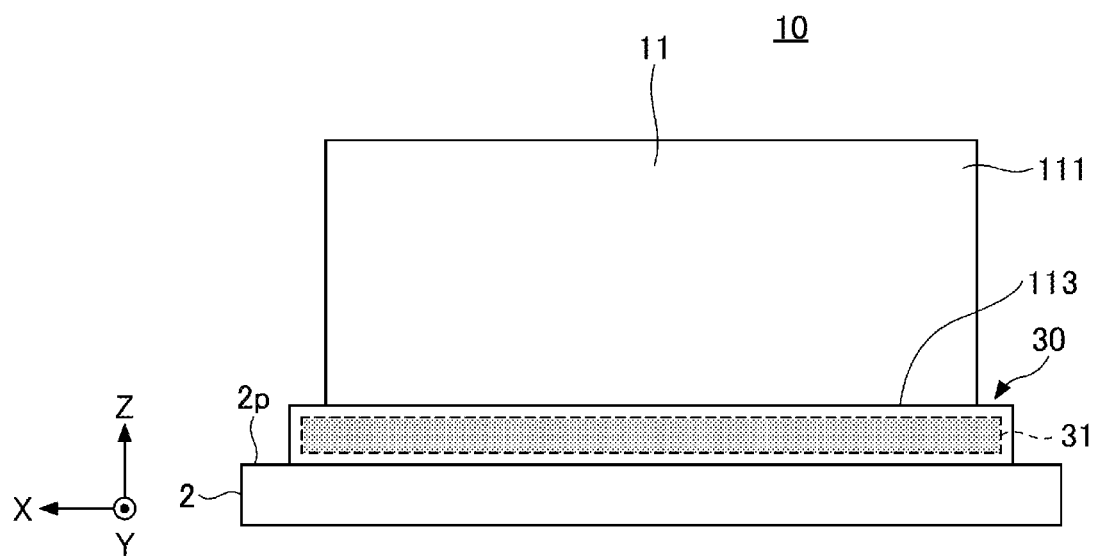
FIG. 16 is a drawing illustrating an example installation of the desktop illumination device.
Figure 17:
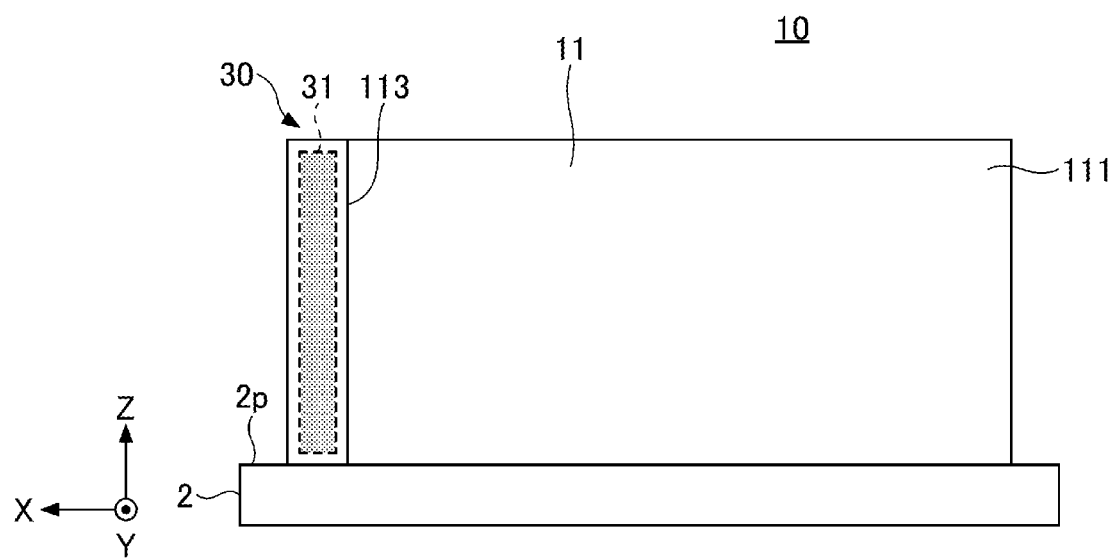
FIG. 17 is a drawing illustrating an example installation of the desktop illumination device.

FIGS. 16 and 17 are drawings illustrating usage scenarios of the desktop illumination device 10. In FIG. 16, the light incident surface 113 of the light guide plate 11 is disposed parallel to the installation surface 2p of the desktop illumination device 10, and the light source part 30 is disposed facing the light incident surface 113 of the light guide plate 11. In the light source part 30, the plurality of light emitting elements 31 are arranged in the X direction. Light output from each of the light emitting elements 31 is incident on the light incident surface 113 situated at the lower end of the light guide plate 11, propagates through the light guide plate 11 in the Z direction, and is output from the first main surface 111 with the light distribution illustrated in FIG. 3.

In FIG. 17, the light incident surface 113 of the light guide plate 11 is disposed perpendicularly to the installation surface 2p of the desktop illumination device 10, and the light source part 30 is disposed along the light incident surface 113 of the light guide plate 11 so as to extend in the Z direction from the installation surface 2p. In the light source part 30, the plurality of light emitting elements 31 are arranged in the Z direction. The side surface of the light guide plate 11, which faces the light emitting elements 31 of the light source part 30, serves as the light incident surface 113.

Light output from each of the light emitting elements 31 is incident on the light incident surface 113 situated at the side end of the light guide plate 11, propagates through the light guide plate 11 in the X direction, and is output from the first main surface 111 with the light distribution illustrated in FIG. 3.

The light guide plate 11 is transparent to visible light. Therefore, in both the usage scenario of FIG. 16 and the usage scenario of FIG. 17, the user can see behind the light guide plate 11, and an open illumination space can be thus provided.

Figure 18:
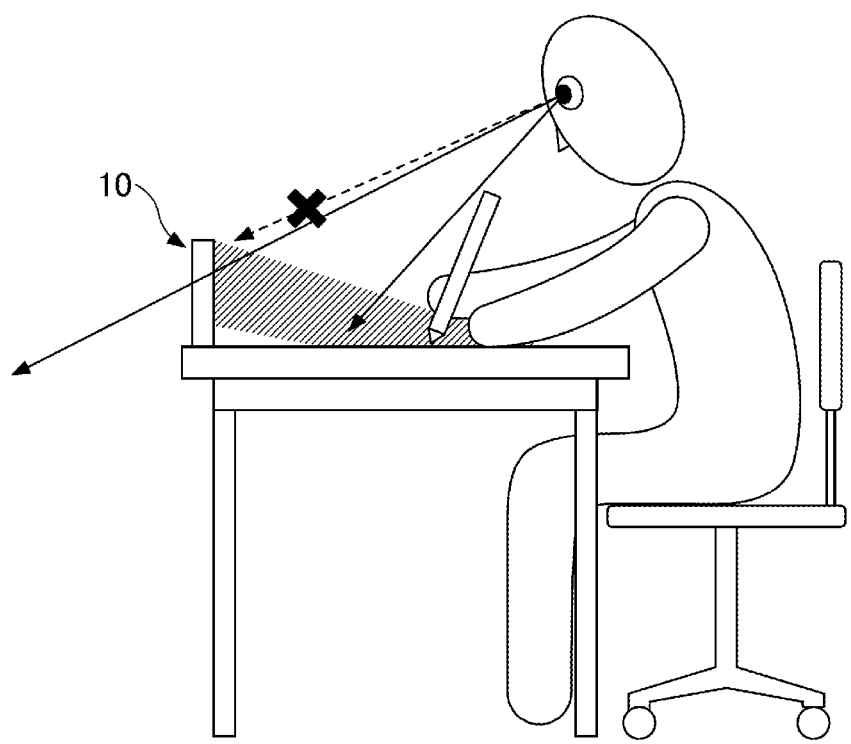
FIG. 18 is a schematic view illustrating the effects of the desktop illumination device.

FIG. 18 is a schematic view illustrating the effects of the desktop illumination device 10. In the desktop illumination device 10, light is emitted in the range of −90° or more to less than 0° in the vertical direction. The user's work area and hands can be uniformly illuminated by the emitted light. The user can see behind the desktop illumination device 10 through the desktop illumination device 10 while visually recognizing the work area.

As indicated by a cross mark, light emitted from the desktop illumination device 10 can be hardly directly perceived. Therefore, flicker can be reduced, and work efficiency can be maintained.

Although the present invention has been described based on specific example configurations, the present invention is not limited to the above-described example configurations. Any of the low refractive index layer configurations of FIGS. 7A through 7C may be combined with any of the light extracting configurations of FIGS. 9 through 15. The arrangement direction of the light emitting elements 31 of the light source part 30 may be either the horizontal direction or the vertical direction. In any case, an open illumination space with less oppressive feeling and less flicker can be achieved by emitting light from the transparent light guide plate in a direction in which the light tends not to directly perceived by the user.

This application is based on and claims priority to Japanese Patent Application No. 2020-127348, filed on Jul. 28, 2020, the entire contents of which are incorporated herein by reference.

DESCRIPTION OF THE REFERENCE NUMERALS

2p installation surface
10, 10A to 10J desktop illumination device
11, 11A to 11J light guide plate
111 first main surface
112 second main surface
113 light incident surface
15 light extractor
151 optical cavity (void)
16, 17 light extracting layer
161, 171 optical cavity (void)
162 outermost surface
26, 27 low refractive index layer
28a, 28b cover layer
30 light source part
31 light emitting element
251, 252 prism part
253, 254 uneven part
300 light guide

The invention claimed is:

1. A desktop illumination device, comprising:
a light source; and
a light guide including a light guide plate and configured to guide light emitted from the light source, wherein the light guide is transparent to visible light and see through such that an area behind the light guide is visible,
wherein the light guide plate has a light incident surface on which the light from the light source is incident, a first main surface from which the light entering from the light incident surface is emitted, and a second main surface opposite the first main surface,
the first main surface is disposed substantially perpendicularly to an installation surface of the desktop illumination device, and
an angle at which an intensity becomes maximum in a light distribution of the light emitted from the first main surface is in a range of −90° or more to less than 0°, in a case where an axis passing through a center of the first main surface and perpendicular to the installation surface is defined as a vertical axis, and in a plane including the vertical axis and perpendicular to the installation surface, a direction parallel to the installation surface is defined as vertical 0°, an upward angle with respect to the vertical 0° is defined as a positive angle, and a downward angle with respect to the vertical 0° is defined as a negative angle.

2. The desktop illumination device according to claim 1, wherein a light distribution of the light emitted from the center of the first main surface is in a range of −90° to +90° in a horizontal direction, in a case where an axis passing through the center of the first main surface and parallel to the installation surface is defined as a horizontal axis, a direction orthogonal to a light emitting surface and extending from the center of the light emitting surface toward an emission side to which the light is emitted is defined as horizontal 0° in a plane including the horizontal axis and parallel to the installation surface, and a clockwise angle from the horizontal 0° is defined as a positive angle and a counterclockwise angle from the horizontal 0° is defined as a negative angle with respect to the plane parallel to the installation surface as viewed from a side opposite to the installation surface.

3. The desktop illumination device according to claim 1, wherein the light guide includes a low refractive index layer on either the first main surface or the second main surface, the low refractive index layer having a lower refractive index than a refractive index of the light guide plate.

4. The desktop illumination device according to claim 3, wherein the light guide includes the low refractive index layer on each of the first main surface and the second main surface.

5. The desktop illumination device according to claim 1, wherein the light guide includes a light extractor configured to cause the light propagating through the light guide plate to be emitted from the first main surface with the light distribution.

6. The desktop illumination device according to claim 5, wherein the light extractor includes one or more voids provided in the light guide plate, and the one or more voids are configured to totally reflect the light propagating through the light guide plate and cause the light to be emitted from the first main surface with the light distribution.

7. The desktop illumination device according to claim 5, wherein the light extractor is a light extracting layer disposed on the first main surface, and
the light extracting layer includes one or more voids that are configured to totally reflect the light, entering the light extracting layer from the light guide plate, and cause the light to be emitted from an outermost surface of the light extracting layer.

8. The desktop illumination device according to claim 5, wherein the light extractor is a light extracting layer disposed on the second main surface, and
the light extracting layer includes one or more voids that are configured to totally reflect the light, entering the light extracting layer from the light guide plate, and cause the light to be emitted toward the first main surface.

9. The desktop illumination device according to claim 5, wherein the light extractor is a prism part or an uneven part provided on the second main surface and configured to cause the light propagating through the light guide plate to be directed toward the first main surface.

10. The desktop illumination device according to claim 1, wherein the light incident surface of the light guide plate is disposed parallel to the installation surface.

11. The desktop illumination device according to claim 1, wherein the light incident surface of the light guide plate is disposed perpendicularly to the installation surface.

12. The desktop illumination device according to claim 1, wherein the light guide includes a low refractive index layer on either the first main surface or the second main surface, the low refractive index layer having a lower refractive index than a refractive index of the light guide plate,
wherein the light guide includes a light extractor that is different from the low refractive index layer and is configured to cause the light propagating through the light guide plate to be emitted from the first main surface with the light distribution, and
wherein the light extractor includes one or more voids provided in the light guide plate, and the one or more voids are configured to totally reflect the light propagating through the light guide plate and cause the light to be emitted from the first main surface with the light distribution.

13. The desktop illumination device according to claim 12, wherein the low refractive index layer is a protection layer that protects the first main surface or the second main surface from dirt or scratches.

14. The desktop illumination device according to claim 1, wherein the light guide includes a low refractive index layer on either the first main surface or the second main surface, the low refractive index layer having a lower refractive index than a refractive index of the light guide plate,
wherein the light guide includes a light extractor that is different from the low refractive index layer and is configured to cause the light propagating through the light guide plate to be emitted from the first main surface with the light distribution, and
wherein the light extractor is a light extracting layer disposed on the first main surface, and the light extracting layer includes one or more voids that are configured to totally reflect the light, entering the light extracting layer from the light guide plate, and cause the light to be emitted from an outermost surface of the light extracting layer.

15. The desktop illumination device according to claim 14, wherein the low refractive index layer is a protection layer that protects the first main surface or the second main surface from dirt or scratches.

16. The desktop illumination device according to claim 1, wherein the light source is provided adjacent to a bottom surface of the light guide.

17. The desktop illumination device according to claim 1, wherein the light guide comprises: an upper end surface, a lower end surface, and a pair of opposing side surfaces extending vertically between the lower end surface and the upper end surface; and
wherein the light incident surface is one of the opposing side surfaces of the light guide plate, or the light incident surface is the lower end surface of the light guide plate.

* * * * *